United States Patent [19]
Holmquist

[11] Patent Number: 4,864,617
[45] Date of Patent: Sep. 5, 1989

[54] SYSTEM AND METHOD FOR REDUCING DEADLOCK CONDITIONS CAUSED BY REPEATED TRANSMISSION OF DATA SEQUENCES EQUIVALENT TO THOSE USED FOR INTER-DEVICE SIGNALLING

[75] Inventor: Kurt E. Holmquist, Largo, Fla.

[73] Assignee: Paradyne Corp., Largo, Fla.

[21] Appl. No.: 73,464

[22] Filed: Jul. 15, 1987

[51] Int. Cl.$^4$ .............................................. H04L 9/00
[52] U.S. Cl. .......................................... 380/49; 380/9; 380/48
[58] Field of Search ....................... 380/6, 8, 9, 19, 28, 380/44, 48–50; 364/200, 900

[56] References Cited

U.S. PATENT DOCUMENTS

| | | | |
|---|---|---|---|
| Re. 25,521 | 2/1964 | Morris | 380/19 X |
| 3,142,722 | 7/1964 | Terek | 380/19 X |
| 3,147,061 | 9/1964 | Walker, Jr. et al. | 380/19 X |
| 3,341,659 | 9/1967 | Stern | 380/8 X |
| 3,391,344 | 7/1968 | Goldberg | 380/48 X |

Primary Examiner—Stephen C. Buczinski
Assistant Examiner—Bernarr Earl Gregory
Attorney, Agent, or Firm—Kane, Dalsimer, Sullivan, Kurucz, Levy, Eisele & Richard

[57] ABSTRACT

A system and method for reducing the probability of deadlock conditions caused by the repeated transmission of data frames containing data sequences equivalent to those used by serial data communications equipment for inter-device signalling uses a technique wherein a link data input is scrambled for transmission over a channel. The system comprises a commonly used scrambler modified so that a selector is placed in the path of the scrambled data which is to be transmitted and fed back to a shift register. The selector also can select unscrambled generated signalling patterns for transmission through the channel. At the remote end of the channel, a receiver circuit comprises a commonly used self-synchronizing descrambler for reproducing the unscrambled link data at the output. The receiver circuit also comprises signalling pattern detectors for detecting the unscrambled signalling patterns. Patterns are generated at the transmitter and sent to the channels by the selector. In the event that the transmitted scrambled data matches a signalling pattern at one of the detectors, this portion of the scrambled data may be lost. However, a deadlock condition resulting from repeated efforts to send the same link data which failed because of detection by one of the signalling pattern detectors will not occur because each identical frame of link data will generally result in a different frame of scrambled data.

4 Claims, 1 Drawing Sheet

SYSTEM AND METHOD FOR REDUCING DEADLOCK CONDITIONS CAUSED BY REPEATED TRANSMISSION OF DATA SEQUENCES EQUIVALENT TO THOSE USED FOR INTER-DEVICE SIGNALLING

BACKGROUND OF THE INVENTION

1. Field of the Invention

This invention relates to a system and method for reducing the probability of deadlock conditions caused by the repeated transmission of data frames containing data sequences equivalent to those used by serial data communications equipment for inter-device signalling.

2. Description of the Prior Art

In present use are several types of serial data communications devices (modems, multiplexers, encryptors) which are, in their simplest form, completely insensitive or transparent to the contents of a data stream. They employ special signaling patterns to communicate information from one device to an equivalent device at the other end of the communication plane. Such information might include, for example, pseudo-controlled-carrier operation in which the "carrier detect" output at one end of the link follows he "request-to-send" input at the other end without actual loss of carrier signal. Since these devices have no control over the data being sent through the communications link by the Data Terminal Equipment (DTE) it is always possible that one of the signaling patterns may occur by chance in the data stream. The response of the receiving device to the special sequence would generally result in loss or corruption of some portion of the link data. The typical approach taken to minimizing the likelihood of these losses is to use very long sequences of pseudorandom data or sequences which are known to be improbable based on the protocol(s) expected to be in use.

A more serious problem which occurs in the aforementioned situation than the initial loss of data is that the error recovery procedures of the higher level protocol in use on the communications link will call for a re-transmission of the lost data. If the initial (falsely detected) signalling pattern was completely contained in a single data frame, it will be transmitted by the DTE again and trigger the same erroneous response and loss of data at the receiver. This results in a deadlock condition which can probably only be removed by abandoning the attempts to send this particular frame of data. Thus the link is, in effect, opaque to the data i this frame.

OBJECTIVES AND SUMMARY OF THE INVENTION

It is an objective of the present invention to provide a system and method for reducing the probability of deadlock conditions caused by the repeated transmission of data frames containing data sequences equivalent to those used by serial data communications equipment for inter-device signaling.

It is a further objective to provide a system and method wherein, in general, repeated transmissions of the same sequence of communications link data produce sequences in a scrambled data stream which are significantly different from each other.

Other objectives and advantages of the invention will become apparent from the following description of the invention.

A self synchronizing scrambler-descrambler is placed in series with the link data stream and normal link data is scrambled at the transmitter of the system and descrambled at the receiver. (Scramblers of this type are widely used in modems to randomize the modulating signal.) In this system, the signaling patterns are inserted into the transmission path after the data is scrambled and removed from the transmission path before they reach the descrambler in the receiver such that they are not scrambled and then are detected at the receiver before the data passes through the descrambler. The operation of the scrambler is such that the value of any bit in the scrambled data stream is a function not only of the actual link data but also of two of the preceding bits in the scrambled data stream which are, in turn, each functions of two bits of scrambled data which preceded them (and so forth). Therefore, in general, repeated transmissions of the same sequence of link data produce sequences in the scrambled data stream which are significantly different from each other. Since the signalling patterns are inserted and detected in the scrambled data stream, if one sequence of link data by chance reproduces a signalling pattern, subsequent re-transmissions of this same link data, which will produce completely different sequences in the scrambled data stream, will not cause the same results.

The system for implementing the method of the present invention includes a link data input, one or more signalling pattern generators, a selector for selecting the link data or a signaling pattern for transmission to a channel, and a shift register and arrangement of gates connected to each other forming a feedback path via the selector and functioning to randomize the link data based on previously transmitted scrambled data and thus scramble only the link data when sent over the channel by the selector.

The system of the present invention also includes a receiver having a shift register for descrambling the scrambled data signal, an arrangement of gates in series with the shift register through which the descrambled data output of the shift register is conveyed to a link data output, and one or more signalling pattern detectors which are connected to the channel to receive signalling patterns before they pass through the descrambler since the signalling patterns have been placed into the transmission path after the data has been scrambled and thus do not require a descrambling before being detected.

DETAILED DESCRIPTION OF THE PREFERRED EMBODIMENT

Figure 1:
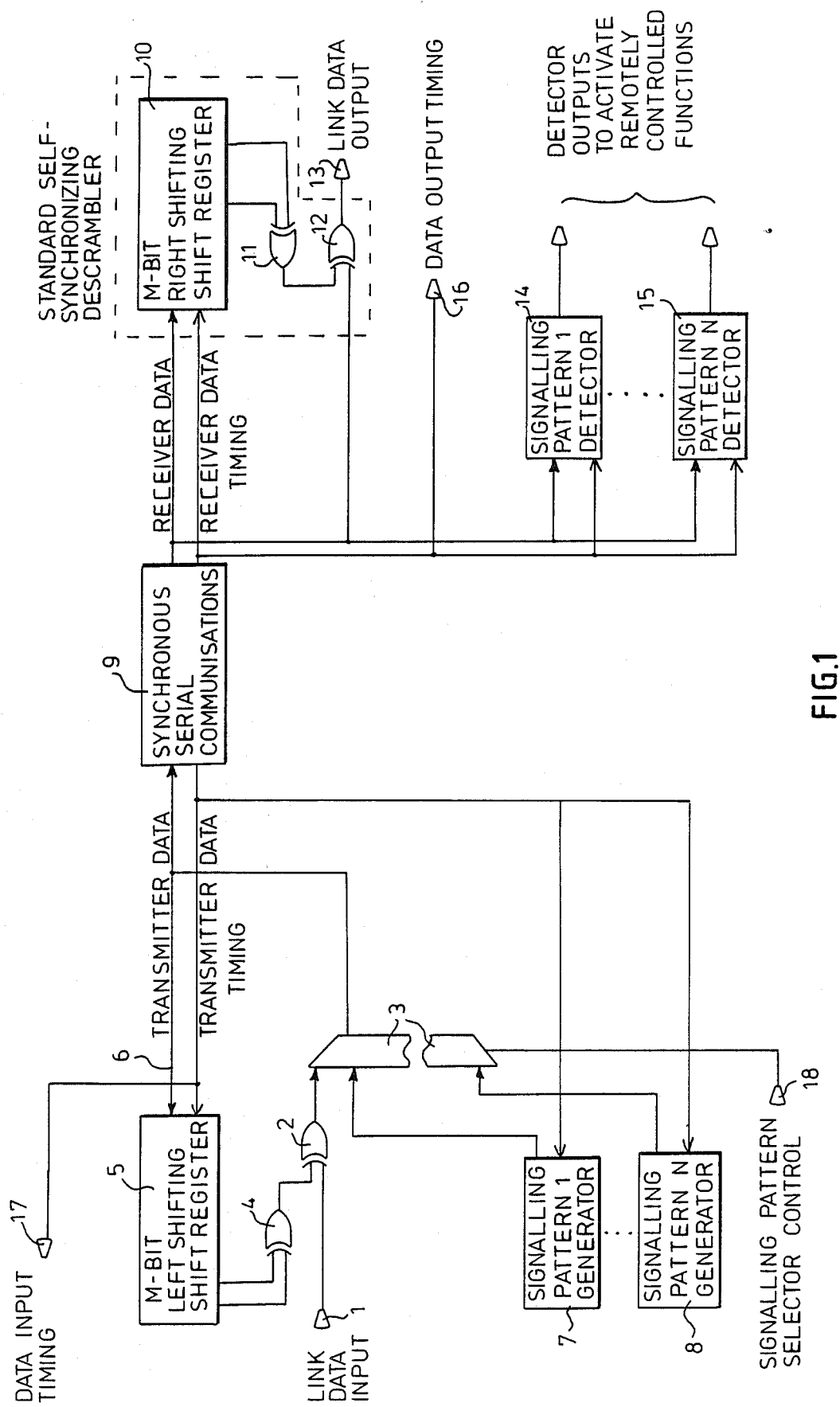
FIG. 1 is a schematic of the system of the present invention.

As shown in FIG. 1, a link data input 1 conveys data to an exclusive-or gate 2 which in turn conveys it to a selector 3. Exclusive-or gate 2 scrambles link data by a polynomial determined by the shift register 5 bit length and the location of its center "tap". The scrambler formed by shift register 5 and exclusive-or gates 4 and 2 is identical to those commonly used in modems to randomize the modulating signal. Selector 3 functions to transmit unscrambled signalling patterns from generators 7 and 8 over channel 9 when it is not transmitting scrambled link data over the channel. Selector 3 also functions to initialize shift register 5 with the immediately previously transmitted data when the channel transmission is being changed from a signalling pattern to scrambled link data and its inclusion in the feedback path ensures that the change to scrambled link data is instantaneous. This in turn insures that scrambled link data immediately following a signalling pattern will be properly descrambled at the receiver.

With regard to shift register 5 and exclusive-or gates 4 and 2, it is noted that the shift register length and the location of the middle "tap" can be any of a number of combinations. It has been determined that the best results are obtained if values are selected so that a maximum length pseudo-noise sequence whose length is a prime number is generated. The configuration shown with a seven bit shift register and the tap at bit 4 accomplishes this goal. As stated previously, selector 3 selects either the scrambled link data or one of several (unscrambled) signalling patterns from generators 7 and 8 or other signalling pattern generators. The transmitted data (signalling pattern or scrambled link data) is always fed back into shift register 5 to maintain the validity of the scrambling operation.

In the receiver circuit of the present system, the descrambling is done using m-bit rightward shifting shift register 10 which is connected in series with exclusive-or gates 11 and 12 to produce a link data output 13. The link data produced at output 13 is the same as the link data introduced at input 1 to the transmitter. However, the receiver also contains signalling pattern detectors 14 and 15 which detect the unscrambled signalling patterns generated by generators 7 and 8 before they reach the descrambler. As an example, operation of one of the signalling pattern detectors may be such that it shuts off the link data output from gate 12 when it detects the signalling pattern. Of course the detectors would individually sense and respond to transmitted data which, when scrambled, forms a pattern identical to the pattern which they have been designed to detect. In this instance the transmitted data would be lost but error recovery procedures of the higher level protocol in use on the link would call for a retransmission of the lost data. Since the scrambled data for an identical link data input would almost certainly be different from that previously sent, it would almost certainly not be detected by one of the signalling pattern detectors again and, as previously stated, would be conveyed to the link data output 13 through shift register 10 in the ordinary mode of operation. Thus a deadlock condition would be avoided and there would be no need to abandon the attempt to send a particular frame of link data.

Selector 3 operates such that a signal received from the signaling pattern generator causes a stopping of the transmission of data while the signalling pattern is sent over channel 9. Examples of signalling patterns which might be generated are signalling to alert the receiver that a special message such as a down line load of a new operating configuration will be forthcoming or signalling to remotely command some temporary test configurations such as a remote digital loopback.

Data Input Timing 17 and Data Output Timing 16 are used to clock all circuitry respectively in the transmitter and receiver sides. As is shown in FIG. 1, they both are obtained from synchronous serial communications channel 9.

Obviously numerous modifications may be made to the invention without departing from its scope as defined in the appended claims.

What is claimed is:

1. A system for reducing the probability of deadlock conditions caused by repeated transmission of data frames containing data sequences equivalent to those used by data communications equipment for inner-deviced signalling comprising:

a transmitter circuit comprising means for conveying generated input data, a first gate having a first input connected to said conveying means, a selector connected to an output of said gate and having an output connected to a communications channel, means for feeding back signals from said selector output to a second input of said first gate, and one or more means for generating signal pattern, each of said one or more signal pattern generating means having an output connected to an input of said selector;

said first gate including means for exclusive-ORing signals from said feedback means with signals from said conveying means whereby said input data is scrambled; and a receiver circuit comprising data signal descrambling means connected to said channel, and one or more signal ling pattern detectors connected to said channel.

2. The system of claim 1 wherein said feedback means comprises a shaft register connected to said selector output whereby said selector initializes said shift register with the immediately previously transmitted data when changing from a signal ling pattern back to channel data transmission, and a second gate having two inputs respectively connected to outputs of said register and having an output connected to said second input of said first gate.

3. A method for reducing probability of dead lock conditions caused by repeated transmission of data frames containing data sequences equivalent to those used by serial data communications equipment for inter-device signal ling comprising the steps of:

inputting generated data signals to a first input of a first gate, said first gate including means for exclusive-ORing said first input and a second input thereby generating scrambled data signals;

outputting said scrambled data signals from said first gate to a selector;

transmitting said scrambled data signals from said selector over a channel and over a feedback path to said second input of said first gate;

transmitting generated unscrambled signal ling patterns through said selector onto said channel;

receiving said transmitted scrambled data signals from said channel and scrambling them; and detecting and receiving said transmitted generated unscrambled signal ling patterns from said channel.

4. The method of claim 3 wherein said step of transmitting said scrambled data signals over a feedback path comprises said selector initializing a shift register with the immediately previously transmitted data when changing channel transmission from said generated unscrambled signal ling patterns to said scrambled data signals.

* * * * *